(12) United States Patent
Schucker

(10) Patent No.: US 7,255,961 B2
(45) Date of Patent: Aug. 14, 2007

(54) THIN FILM COMPOSITE ELECTROLYTE

(75) Inventor: Robert C. Schucker, The Woodlands, TX (US)

(73) Assignee: Trans Ionics Corporation, The Woodlands, TX (US)

( * ) Notice: Subject to any disclaimer, the term of this patent is extended or adjusted under 35 U.S.C. 154(b) by 365 days.

(21) Appl. No.: 10/799,076

(22) Filed: Mar. 12, 2004

(65) Prior Publication Data

US 2007/0154762 A1    Jul. 5, 2007

(51) Int. Cl.
*H01M 2/14*     (2006.01)
*H01M 6/04*     (2006.01)
*H01M 6/18*     (2006.01)

(52) U.S. Cl. .................. 429/129; 429/188; 429/304

(58) Field of Classification Search ............. 429/129, 429/188, 304
See application file for complete search history.

(56) References Cited

U.S. PATENT DOCUMENTS

| | | | |
|---|---|---|---|
| 3,896,018 A | 7/1975 | Powers et al. | |
| 3,896,019 A | 7/1975 | Mitoff et al. | |
| 3,900,381 A | 8/1975 | Powers | |
| 3,901,733 A | 8/1975 | Toy et al. | |
| 3,976,554 A | 8/1976 | Powers et al. | |
| 3,985,575 A | 10/1976 | Ludwig | |
| 4,038,464 A | 7/1977 | Baukal et al. | |
| 4,041,215 A | 8/1977 | Kormanyos et al. | |
| 4,226,923 A | 10/1980 | Mikkor | |
| 4,244,986 A | 1/1981 | Paruso et al. | |
| 4,422,917 A | 12/1983 | Hayfield | |
| 4,526,844 A | 7/1985 | Yoldas et al. | |
| 4,568,502 A | 2/1986 | Theodore et al. | |
| 5,053,294 A | 10/1991 | Sernka et al. | |
| 5,059,497 A | 10/1991 | Prince et al. | |
| 5,112,703 A | 5/1992 | Koenig | |
| 5,171,645 A * | 12/1992 | Khandkar | 429/33 |
| 5,290,405 A * | 3/1994 | Joshi et al. | 205/338 |
| 5,580,430 A * | 12/1996 | Balagopal et al. | 204/252 |
| 5,691,082 A | 11/1997 | Kajita et al. | |
| 5,958,361 A | 9/1999 | Laine et al. | |
| 2002/0172871 A1 | 11/2002 | Schucker | |

FOREIGN PATENT DOCUMENTS

EP         453796       10/1991
JP         2-199076     *  8/1990

OTHER PUBLICATIONS

J.S. Reed, "Introduction to the Principles of Ceramic Processing", John Wiley & Sons, 1989, p. 397.*
J.L. Sudworth & A.R. Tilley, "The Sodium-Sulfur Battery", Chapman & Hall, New York, 1985.
R.E. Mistler & E.R. Twiname, "Tape Casting: Theory and Practice", American Ceramic Society, 2000, Tables 2.1-2.4.

* cited by examiner

*Primary Examiner*—Dah-Wei Yuan
(74) *Attorney, Agent, or Firm*—Robert C. Shaddox

(57) ABSTRACT

The invention is a thin film composite solid (and a means for making such) suitable for use as an electrolyte, having a first layer of a dense, non-porous conductive material; a second layer of a porous ionic conductive material; and a third layer of a dense non-porous conductive material, wherein the second layer has a Coefficient of thermal expansion within 5% of the coefficient of thermal expansion of the first and third layers.

18 Claims, 5 Drawing Sheets

THIN FILM COMPOSITE ELECTROLYTE

STATEMENT REGARDING FEDERALLY SPONSORED RESEARCH OR DEVELOPMENT

The United States Government has rights in this invention pursuant to Contract No. DE-FG03-01ER83317 between the United States Department of Energy and Trans Ionics Corporation.

BACKGROUND OF THE INVENTION

1. Field of the Invention

The present invention relates to thin film composite electrolyte structures that are preferably ionically conductive and are therefore suitable for use in electrochemical cells, such as secondary batteries based on sodium and sulfur.

2. Related Art

Solid, ionically conductive electrolyte components are utilized in high temperature electrochemical cells, such as secondary batteries based on sodium and sulfur or sodium and a metal chloride. Such electrochemical cells are typically comprised of: a) a liquid anodic reactant; b) a liquid cathodic reactant; and c) a solid electrolyte component that separates the cathode from the anode and that is permeable by either ions from the anodic or cathodic reactants. For example, when the cell is a sodium-sulfur cell, the anodic reactant is liquid sodium, the cathodic reactant is liquid sulfur or a mixture of sulfur and sodium polysulfides, and the electrolyte component is typically comprised of materials such as beta double prime alumina (($\beta''$-$Al_2O_3$) or ($Na_2O.5Al_2O_3$)), NASICON ($Na_3Zr_2Si_2PO_{12}$) or other materials that are permeable only by sodium ions. A complete description of the fabrication and operation of sodium-sulfur cells can be found in the publication by J. L. Sudworth and A. R. Tilley entitled "The Sodium-Sulfur Battery" (Chapman and Hall, New York, 1985). The cell reaction that produces power (discharge cycle) in this device is most generally given as:

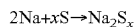

During the discharge cycle, sodium is oxidized (i.e., gives up an electron to form a sodium cation) at the anode and sodium ions migrate from the anode compartment through the solid electrolyte. Therefore, the reaction at the anode during discharge is:

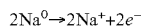

Simultaneously, the following reaction takes place at the cathode where elemental sulfur is reduced:

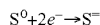

The flow of electrons through the external circuit from the anode to the cathode produces power to drive equipment such as electric motors.

A critical component of the sodium-sulfur battery is the solid electrolyte that allows only the transport of sodium cations while blocking the transport of sulfur anions. Since the original conception of the sodium-sulfur battery, the electrolyte of choice has been $\beta''$-$Al_2O_3$ ($Na_2O.5Al_2O_3$). Other materials, such as NASICON, have shown promise.

There are certain important requirements that the electrolyte component must meet in order to perform effectively in a high temperature electrochemical cell. One of these is a high ion flux; and because ion flux is inversely proportional to the thickness of the electrolyte component, it is desirable to make the electrolyte layer as thin as possible. Another important requirement is low electronic conductivity and this is governed by the choice of electrolyte materials.

There are several conventional methods for fabricating such electrolyte components. For example, there are teachings describing the fabrication of solid electrolyte structures (typically tubes or plates) from $\beta''$-$Al_2O_3$ powder and assembly of the resulting tubes or plates into a structure that is typically hermetically sealed for use in automotive and electrical utility load leveling applications. While $\beta''$-$Al_2O_3$ tubes can be prepared by isostatic compression of the powder, the preferred method of fabrication is electrophoretic deposition as described in U.S. Pat. Nos. 3,896,018; 3,896,019; 3,900,381; and 3,976,554 (all of which are incorporated herein by reference). Further, U.S. Pat. No. 4,038,464 (incorporated herein by reference), discloses the use of fibrous mats in both electrode compartments to enhance the conductivity of the electrodes. The fabrication of $\beta''$-$Al_2O_3$ in shapes other than tubes for greater cell efficiency is taught in U.S. Pat. Nos. 4,226,923; 4,568,502; 5,053,294; and 5,112,703 (all of which are incorporated herein by reference).

There are several inherent disadvantages to cells made by conventional methods. One disadvantage is that electrolytes made from materials such as $\beta''$-$Al_2O_3$ have low ion flux, because the electrolyte must be thick enough to also provide mechanical support. So, while it is generally known that thinner electrolytes have higher ion flux, these unsupported electrolyte tubes of the prior art can typically not be optimized for high flux because of the limitations of their mechanical strength.

Another disadvantage of conventional methods results from forming the electrolyte as tubes on mandrels (typical of the electrophoretic deposition method) because there is a limit on the minimum diameter of the tube and also on its maximum length. This, in turn, limits the surface area to volume ratio, and thus the energy density, of the resulting electrochemical cell. For example, sodium-sulfur cells made by conventional techniques have relatively low surface area to volume ratios; and, consequently, they have lower energy densities than desired.

One approach to mitigating these disadvantages is to support the solid electrolyte as a thin film on a suitable microporous support. U.S. Pat. No. 4,244,986 (incorporated herein by reference), discloses the application of a precursor to $\beta''$-$Al_2O_3$ (in the form of a solid) onto supports such as α-alumina, mullite or zirconium oxide. One concern with respect to this approach is the difference in the coefficient of thermal expansion (CTE) between $\beta''$-$Al_2O_3$ ($8.6 \times 10^{-6}/°$ C.) and the preferred supports a-alumina ($8.2 \times 10^{-6}/°$ C.), zirconium oxide ($8.2 \times 10^{-6}/°$ C.) and especially mullite ($5.2 \times 10^{-6}/°$ C.). A second concern is that none of the listed refractory ceramic supports are electrically conductive, thereby limiting the configuration of a sodium-sulfur cell made by this process to one in which the anode reactant is on the support side.

While U.S. Pat. No. 4,526,844 (incorporated herein by reference) discloses that NASICON can also be used as the solid electrolyte in a sodium-sulfur cell, there are no actual examples showing that a thin film composite of such a material was ever made. This may be because of the significant mismatch in CTE between NASICON ($\sim 1 \times 10^{-6}/°$ C.) and most microporous substrates.

U.S. Pat. No. 5,059,497 (incorporated herein by reference) discloses the fabrication of a composite, ion-conductive electrolyte member comprised of a first layer of an ion conductive material such as $\beta''$-$Al_2O_3$, and a second, or substrate layer, comprised of a material selected from aluminum silicon carbide, doped tin oxide, graphite, or composites, compounds, mixtures, and/or combinations of these materials. A preferred material is selected from the titanium dioxide family as disclosed in U.S. Pat. Nos. 4,422,917 and 3,985,575 (both of which are incorporated herein by reference) (tantalum or niobium-doped $TiO_2$). According to the '497 patent, the first layer is much thinner than the second in order to provide higher ion flux and the second layer is substantially thicker to provide suitable mechanical support. The first layer can be applied by, among other techniques, electrophoretic deposition.

U.S. Serial No. 20020172871A1 (incorporated herein by reference) describes one method of fabricating an improved electrochemical cell a) with an anode (and corresponding anodic reactant); b) a cathode (and corresponding cathodic reactant); and c) a composite ion-conductive electrolyte structure with: i) a first layer, preferably thin-film in nature, that is a mixture of two or more chemically distinct compounds, at least one of which is ion-conductive; and ii) a second layer bonded the first layer, where the second layer is any refractory support structure having: (1) an effective porosity that will allow an effective flow of anodic or cathodic reactants to the first layer; and (2) a coefficient of thermal expansion within 5% of the first layer's material. The objective of utilizing a mixture of two or more chemically different compounds in this application was to achieve a match in the coefficient of thermal expansion.

Another attempt to construct a suitable solid electrolyte is described in U.S. Pat. No. 3,901,733 (incorporated herein by reference). This patent describes a two layer beta alumina structure. The first layer is a thin (50-1,000 microns) conductive dense layer of $\beta$ alumina, and the second layer is a thicker substrate or backing of porous beta or beta double prime alumina. The conductive dense layer is coated on the substrate (plasma or slurry spraying, or granular deposition), and sintered to a final temperature between 1,500 to 1,800° C. Unfortunately, such an asymmetric two layer composite is subject differential shrinkage in the sintering process, making the composition unreliable as a structural material.

Therefore, while conventional methods have provided solid ion-conductive electrolyte components for sodium sulfur electrochemical cells with varying commercial success, there is still a need in the art for solid ion-conductive electrolytes with improved ion-conductive properties and improved mechanical properties that can withstand the stresses associated with wide temperature swings. There is also a need in the art for improved methods of making these solid ion-conductive electrolytes. The present invention addresses these needs.

SUMMARY OF THE INVENTION

The present invention includes: (1) a supported thin film composite solid electrolyte and (2) a process for making this electrolyte.

The electrolyte of the present invention, in its preferred structure, is a supported thin film composite forming a sandwich-like structure of at least three layers, with two exterior layers and an interior layer. While it is possible to create such films as two layer structures (i.e., asymmetric in nature), it has been found that these electrolytes are subject to distortion due to thermal and mechanical stresses that occur during sintering, and that such distortions do not occur for symmetric configurations. To minimize distortions, it is preferred that the sandwich have a center layer and two exterior layers symmetric with respect to the center, the exterior layers having substantially the same thickness, with a variation of up to 15% in the exterior layers. Further, the preferred geometry of the structure of the present invention is planar though it is possible to make the electrolyte of the present invention in tubular form. Two different preferred configurations of the three layers for the electrolyte are described. In each configuration, there is at least one thin, dense layer less than about 100 microns in thickness and preferably less than 50 microns in thickness that is the functional electrolyte layer. The term "dense" is used to mean non-porous, however, the dense layer must be ionically conductive with respect to one of the charged reactants (generally sodium in a sodium/sulfur cell), generally through a diffusion process. For the sodium sulfur battery application a preferred material for the dense layer is $\beta''$-$Al_2O_3$. Depending on the configuration selected, it is supported on a second layer that is microporous or between two second layers that are microporous, so that reactants can flow to the electrolyte surface as necessary. The thicker microporous layer gives mechanical strength to the composite (herein, "porous" or "microporous" layer refers to an effective porosity and permeability that will allow an effective flow of anodic or cathodic reactants through the layer).

A feature of the preferred embodiment of the present invention is that this microporous structure is also $\beta''$-$Al_2O_3$. By constructing the electolyte in this manner, there is no difference at all in coefficient of thermal expansion between the thin, dense layer(s) and the microporous support layer(s). Further, bonding between the two layers is excellent.

The preferred method of making the composite sandwich structure is tape casting, which is routinely used for making planar components in the microelectronics industry, although other manufacturing methods may be modified to create the three layer structure. An excellent reference for tape casting is a recent book by Richard E. Mistler and Eric R. Twiname entitled "Tape Casting Theory and Practice," American Ceramic Society (2000).

OBJECTS OF THE INVENTION

It is an object of the invention to provide a three layer structure suitable for an electrolyte, where the layers include a microporous layer and a dense non-porous later.

It is an object of the invention to provide a three layer structure suitable for an electrolyte constructed of Beta double prime alumina, beta alumina or NASICON.

It is an object of the invention to provide a three layer planar structure suitable for an electrolyte in a sodium/sulfur cell.

It is an object of the invention to provide a method of creating structures suitable as an electrolyte in a sodium sulfur cell where encapsulation is not utilized during sintering.

It is an object of the invention to provide a method of creating structures suitable as an electrolyte in a sodium sulfur cell where final sintering temperature is at or below 1600° C.

DETAILED DESCRIPTION OF THE INVENTION

The present invention encompasses at least a three layer ionically conductive supported thin film composite solid electrolyte, which has particular application in sodium sulfur (Na/S) cells, although this configuration has potential applications in other electrochemical cells. The invention also encompasses the method of making the solid electrolyte product; the method, however, can be employed to build a two layer product solid electolyte.

Figure 1:
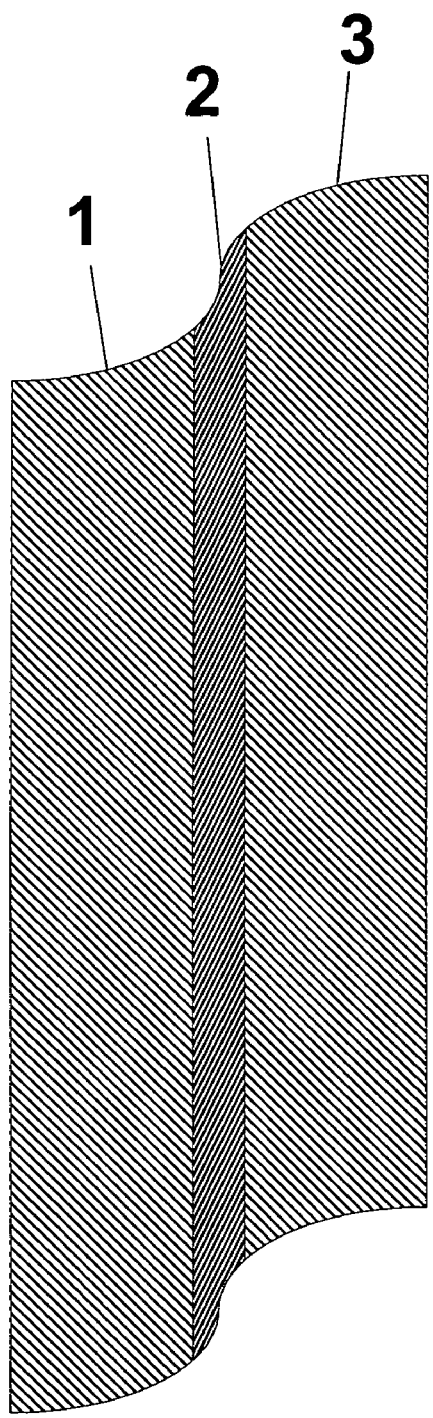
FIG. 1 represents one embodiment of a three layer electrolyte structure.

In one embodiment of the invention shown in FIG. 1, there is provided a single thin dense layer 2 supported between two microporous layers 1 and 3, to form a sandwich structure. In a second and more preferred embodiment of the present invention shown in FIG. 2, there are provided two thin dense layers 11 and 13, sandwiching a center microporous support layer 12.

Each distinct layer may be composed of a series of layers or laminations of the layer forming material.

In both of these embodiments, the chemical composition of the thin dense layer(s) and the microporous support layer(s) are substantially identical, thereby ensuring a match in the coefficient of thermal expansion. For instance, the three layers can be composed of Beta double prime alumina, NASICON, or Beta alumina. It is possible but not preferred to mix Beta and Beta double prime alumina, as their CTE are comparable. Additionally, in some instances a 5 layer structure may be formed, where the outermost exterior layers of the sandwich may be a thin layer of NASICON, although the interior layers may be Beta or Beta double prime, as further discussed later. The preferred material for an electrolyte in a sodium sulfur cell is a beta alumina ($\beta$-$Al_2O_3$) which has the generic formula $Na_2O \cdot xAl_2O_3$, where x can range from 5 to 11. A more preferred material is $\beta''$-$Al_2O_3$ [$Na_2O \cdot 5Al_2O_3$]. In order to accommodate the high sodium content, these materials are typically stabilized with lithium or magnesium oxides, with magnesium preferred (see example 3 discussed herein where $MgCO_3$ is utilized), and such stabilized compounds are also considered as $\beta''$-$Al_2O_3$.

The preferred method of fabricating supported thin film composite electrolyte according to the present invention is tape casting. In the process of making planar ceramics by tape casting, a dry powder of electrolyte or support material is mixed with binders, dispersants, plasticizers and solvents to form a slip, which is then cast using a casting knife to produce a layer of constant thickness. The sheet is then heated to remove solvents. Multiple layers of this sheet can be laminated under heat and pressure to form thicker structures, if desired.

Fabrication of the electrolyte of the present invention by tape casting, however, is not straightforward and a significant amount of work has gone into developing the technique to make acceptable supported thin film composite $\beta''$-$Al_2O_3$ electrolyte. Factors that affect the physical structure and electrochemical characteristics of the resulting thin film supported electrolytes include, but are not limited to: (1) particle size of the powders used to make the dense and microporous layers; (2) type and particle size of pore forming material; (3) formulation of the tape casting slip; (4) temperature and pressure used during lamination of tapes; (5) drying time and temperature of laminated tapes; (6) temperature profile during sintering; (7) final sintering temperature; and (8) holding time at maximum sintering temperature.

It is known that smaller particles sinter faster than larger particles because of their higher surface area and, therefore, the average particle size of the $\beta''$-$Al_2O_3$ powder for the thin, dense electrolyte film and that for the microporous support are different in order to provide different rates of sintering (densification) during processing. In the present invention, the thin, dense layer is formed from nanoparticulate $\beta''$-$Al_2O_3$ having an initial average particle size of from 10 to 500 nm (a "Nanoparticulate"), more preferentially from 20 to 200 nm and most preferentially from 20 to 150 nm. Nanoparticulate $\beta''$-$Al_2O_3$ can be prepared using flame spray pyrolysis as described in U.S. Pat. No. 5,958,361 (incorporated herein by reference). The microporous layer is formed from $\beta''$-$Al_2O_3$ having an initial average particle size of from 0.5 to 5 microns, more preferentially from 0.5 to 3 microns and most preferentially from 0.5 to 2 microns. Nanoparticulate can be used for the micro porous layer, but it is not preferred.

For the purpose of forming pores in the microporous layer during sintering, any material that combusts completely in air during the sintering process can be used. Examples of pore formers that are typically used are rice hulls, corn starch and carbon black, and other materials which will combust without leaving substantial residues, such as organic or cellulostic materials having sufficient volume and shape to create porosity and permeability in the support layer once combusted. The particle size of the chosen pore formers is an important property to the final end product's characteristics. Particles that are too small result in very small pores which are not always interconnected, and hence results in low permeability, slowing or blocking the flow of reactants across the electrolyte support layer. A preferred pore former for the present invention is rice hulls.

The amount of pore former in the casting slip also has an impact on the resulting structure of the microporous section. Rice hull contents between 25 wt % and 40 wt % were evaluated and it was found that at 40 wt %, the microporous structure collapsed as a result of excessive porosity. At 25 wt % rice hulls, the porosity resulted in a functional layer, but flow through the layer was not as effective as desired. Therefore, the preferred rice hull content is 25 wt % to 40 wt %, more preferably from 27 wt % to 35 wt %. Thus, a pore former is desired that will provide sufficient permeability for the reactants through the microporous layer, but not so great as effect the support properties of the microporous layer. With sufficient porosity, the needed thickness of porous support layer will be controlled by the mechanical structural requirements of the particular application, for instance, a planar electrolyte in a given cell configuration may require a thicker layer than a cylindrical electrolyte due to the inherent structural advantages of the cylindrical form.

The $\beta''$-$Al_2O_3$ electrolyte could be prepared as a powder for subsequent formation into the dense electrolyte layer or the microporous support. Slips for tape casting were formulated and the procedure used was that specified by Mistler and Twiname for alumina materials ("M&T", herein incorporated by reference). The powders were first dried carefully to remove any moisture. Dried powders were then added to a mixture of solvents (a list of suitable solvents is contained on pages 18-19 of M&T) containing a dispersant (a list of dispersants is contained in Table 2.1 of M&T, incorporated by reference) and mixed further to distribute the dispersant onto the particle surfaces. To this was then added a binder (a list of binders is contained in Table 2.3 of M&T, incorporated by reference) and one or more plasticizers (a list of plasticizers is contained in Table 2.4 of M&T, incorporated by reference) and the material was further mixed to produce a slip suitable for casting. Tapes were cast using a commercially available casting knife having an adjustable gap. Films from 3 to 25 mils were routinely cast onto a silicone-coated Mylar substrate. The cast films were then dried to remove solvent and stored in a dry environment.

Figure 2:
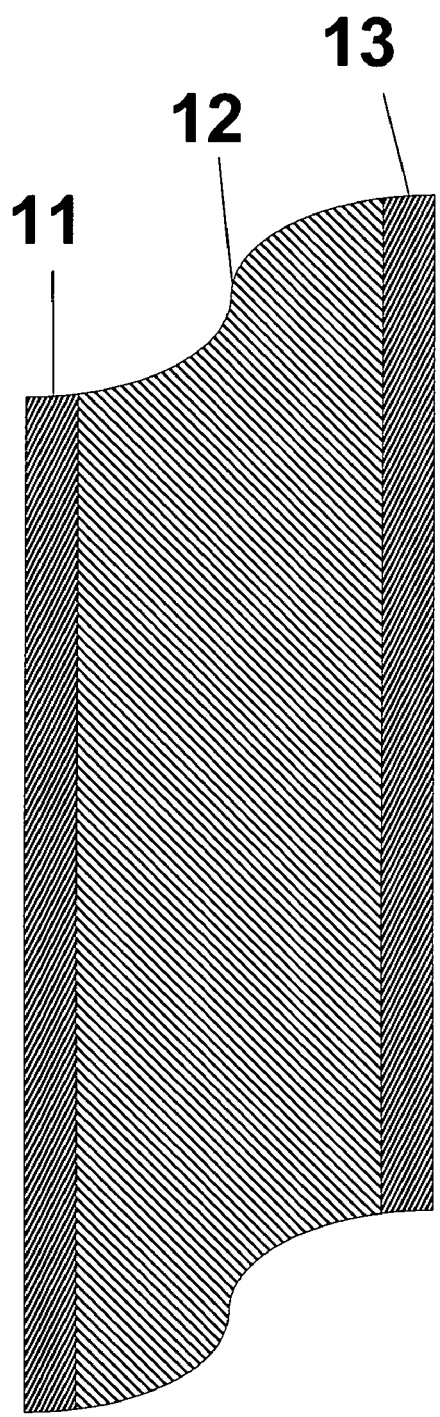
FIG. 2 represents a second embodiment of a three layer electrolyte structure.

Two different tapes must then made in order to form the composite structure. A first tape is fabricated from Nanoparticulate β"-$Al_2O_3$ without pore formers and cast in layers from 1-5 mils in thickness. A second tape is fabricated from larger particle size β"-$Al_2O_3$ plus a pore former and is cast in layers from 5-50 mils in thickness. One or more layers of the first tape are then laminated with one or more layers of the second tape under heat and pressure to form a composite structure. For instance, in the preferred embodiment, the tapes are laminated to form the three layer structure as shown in FIG. 1 or 2. The support microporous layer as well as the dense layer may be formed by lamination of several thinner microporous or dense layers respectively. Lamination is achieved by arranging the layers in stacks and applying pressure perpendicular to the stack while heating the sample. Typical temperatures for lamination lie in the range 50-100° C. depending on the binder being used. Lamination pressure may range from 500 psig to 5,000 psig, more preferably from 1,000 psig to 4,000 psig and most preferably from 2000 psig to 3,000 psig. The laminated structures are then ready for sintering.

The composite laminated tape is then carefully dried and sintered in air to form the final composite electrolyte structure. It is common practice to encapsulate the electrolyte to minimize the loss of sodium (in the form of sodium oxide) from the structure during sintering. In this process, the material to be sintered is place in a closed environment in order to maintain a sodium rich environment. For example, the materials may be encapsulated in a close fitting cylinder to retain sodium (in the form of sodium oxide) escaping in the sintering process. However, the process of the present invention does not require encapsulation and allows free air sintering of the tapes while preserving their ionic conductivity. This is accomplished through a series of drying and sintering steps that maintain the desired high sodium content. Note however, that if NASICON is the structural material for the sandwich, the sintering temperature is substantially lower (~1100-1200° C. to densify the nonporous NASICON layer), well below the temperature at which sodium loss (in the form of sodium oxide) becomes problematic (1275° C.).

First, the laminated structure is dried at or above 100° C. in order to adequately remove moisture prior to sintering. The preferred sintering schedule includes a drying period at 100° C. followed by a slow ramp (1-2° C./min) in temperature from 100° C. to 700° C. to burn off the pore former. Higher terminating temperatures may be needed depending on the chosen pore former material and faster heating rates can be used provided the rate is slow enough to allow combustion gases to escape without causing delamination in the structure. For rice hulls, a ramp rate of 1-2° C./min is adequate.

Once the pore former is combusted, the temperature can be ramped to 1,200° C. at a faster rate (~5° C./min, although these ramp rates are not critical to the final product). Above 1,275° C., $Na_2O$ is known to sublime from the structure and it is desirable to minimize the time above this sublimation temperature. Therefore, the temperature is ramped from 1,200° C. to its final sintering temperature at a rapid rate (25-30° C./min), held for a period that is preferred not to exceed 30 minutes and cooled to 1,200° C. again at 25-30° C./min, followed by a slower cooling rate (~5° C./min) to room temperature. This is to minimize the time above 1275° C. The starting point for the rapid rise can be other than 1200° C. When this sintering schedule is followed, a supported Beta double prime electrolyte layer of excellent ionic conductivity is formed. Again, if NASICON is used as the structural material, the sintering temperature is lower, ~1100° C., and hence, the ramp rates to this temperature and not critical, as loss of sodium is not a concern.

The final sintering temperature is important to the formation of a fully dense structure. A maximum sintering temperature of 1,600-1,650° C. is common for electrolyte articles made by a process of the prior art. U.S. Pat. No. 5,691,082 (incorporated herein by reference) specifies a staged heating cycle wherein a magnesium stabilized electrolyte is sintered to between 1,400° C. and 1,550° C. at a heating rate no greater than 50° C./hr, further heated to a temperature between 1,580° C. and 1,650° C. and holding for no more than 0.1-0.3 hours, followed by cooling again into the temperature range of 1,400° C. and 1,550° C. at a rate of no more than 50° C./hr. However, because of the lowering sintering temperature of Nanoparticulate β"-$Al_2O_3$ and because of the thin nature of the electrolyte film, the process of the present invention can effectively reduce the maximum sintering temperature to ~1,500° C. to ~1600° C. and produce an electrolyte with the desired properties. The maximum time spent at the final temperature can be of the order of ~20 minutes for a 1500° C. final sintering temperature, to ~5 minutes of a 1600° C. final sintering temperature. In effect, the loss of sodium oxide from the microporous structure produces a local atmosphere rich in $Na_2O$, which maintains a sufficient level of sodium in the thin, dense electrolyte to provide the required conductivity without encapsulating the sample. When higher temperatures are used, loss of sodium again becomes a concern, and encapsulation may be needed.

The following non-limiting examples demonstrate an example of the present invention.

EXAMPLE 1—β"-$Al_2O_3$ POWDER PREPARATION, DENSE LAYER

Nanoparticulate β"-$Al_2O_3$ was purchased from TAL Materials Corporation ("TAL") of Ann Arbor, Mich. Approximately 50 g of TAL β"-$Al_2O_3$ was attrition milled for two hours in isopropanol using 3 mm YSZ spherical media in order to break up agglomerates. The isopropanol was evaporated and the powder was dried at 120° C. for 24 hours for subsequent use in production of a slip for tape casting. Use of Nanoparticulate sized powders to form the thin dense layer allows the layer to densify at lower temperatures.

EXAMPLE 2—β"-$Al_2O_3$ POWDER PREPARATION, MICROPOROUS LAYER

A batch of β"-$Al_2O_3$ suitable for use in the microporous support layer was synthesized as follows. Approximately 85.65 g Bayerite alumina (UOP Versal B), 13.82 g $Na_2CO_3$ and 2.53 g $MgCO_3$ were added to an attrition mill and milled in isopropanol using 3 mm YSZ spherical media for 1 hour to homogenize. The slurry was strained to remove the YSZ media and placed in an evaporating dish over a weekend to evaporate most of the isopropanol. The resulting powder was ground lightly with a mortar and pestle and loaded into a series of alumina crucibles, which were in turn placed in a drying oven at 100° C. to complete the drying process. Each crucible (with contents) was weighed while still warm to obtain the initial weight of the reactants. The crucibles were then placed in a muffle furnace, heated to 1,300° C. at 5° C./min in air, held for 4 hours and cooled. Eight crucibles in all were used and the average weight loss per crucible was 36.04±0.15 wt %. The resultant $\beta''$-$Al_2O_3$ powder was attrition milled again in isopropanol to reduce particle size, dried in an evaporating dish in air and finally dried in an oven at 100° C. overnight. This batch was designated RCS-022. A sample of RCS-022 was subjected to X-ray powder diffraction analysis; and the diffraction pattern was found to be consistent with that of $\beta''$-$Al_2O_3$.

EXAMPLE 3—SLIP FORMATION, DENSE LAYER

Into a small (~1 pt) mill jar was added ~215 g ¼" YSZ cylindrical grinding media. To that was added 0.87 g menhaden fish oil (dispersant), 33.41 g mixed xylenes, 33.42 g anhydrous ethanol and 43.40 g hot (about 120° C.) ($\beta''$-$Al_2O_3$ from Example 1). The mill jar was sealed and the mixture milled on a roll mill at 60 rpm for 24 hours. To this was then added 3.48 g polyvinylbutyral (binder) and 1.75 g butyl benzyl phthalate (plasticizer). The mixture was further milled at 60 rpm for 24 hours. The slip was then strained to remove grinding media and de-aired under a slight vacuum (~680 torr) to remove entrained air bubbles. This slip was designated SLIP-026.

EXAMPLE 4—TAPE FORMATION, DENSE LAYER

SLIP-026 from Example 3 was used to cast tapes of different thickness. Tapes of 2 mils, 3 mils and 4 mils were cast onto silicone coated Mylar using a 10" Gardner BYK casting knife with an adjustable gap. Tapes were dried on a heated plate at 40° C. and stored in an evacuated container to minimize moisture uptake.

EXAMPLE 5—SLIP FORMATION, MICROPOROUS LAYER

Into a small beaker was placed 4.5 g attrition milled rice hulls (–325 mesh), 13.50 g unmilled rice hulls (–325 mesh) and 42.00 g $\beta''$-$Al_2O_3$ (RCS-022 from Example 2). The powders had been previously dried in an oven at 110° C. for 24 hours to remove moisture. The powders were mixed with a spatula until visually homogeneous and added to a small mill jar containing ~215 g ¼" YSZ cylindrical milling media. To this was added 1.20 g menhaden fish oil dissolved in 26.40 g mixed xylenes and 26.40 g anhydrous ethanol. The mill jar was sealed, shaken vigorously to mix the components and milled on a roll mill at 60 rpm for 24 hours. To this jar was then added 4.81 g polyvinyl butyral, 3.60 g butyl benzyl phthalate and 3.63 g polyalkylene glycols (plasticizer). The contents were milled for another 24 hours at 60 rpm on a roll mill. The grinding media were strained out and the slip was deaired under a slight vacuum. This slip was designated SLIP-029.

EXAMPLE 6—TAPE FORMATION, MICROPOROUS LAYER

Tapes of 20 and 25 mil thickness were cast with SLIP-029 using the procedure of Example 4.

EXAMPLE 7—LAMINATION

Six pieces (approximately 1"×1") of 25 mil tape prepared from SLIP-029 in Example 6 were dried in an oven at 110° C. for 2 hours. They were placed in a closed container to cool in order to prevent moisture uptake. These six pieces were stacked together and one piece of 3 mil tape from Example 4 was placed on either side of the stack to produce the structure shown in FIG. 2. The stack was laminated under 3,000 psig pressure at 75° C. for 5 minutes using a Carver 12 ton press with 6"×6" heated platens. At that point, they were turned over and the procedure repeated.

EXAMPLE 8—SINTERING

Figure 3:
FIG. 3 is a photomicrograph showing the dense beta double prime alumina surface of the three layer sandwich structure embodiment of FIG. 2, detailing one of the surfaces.
Figure 4:
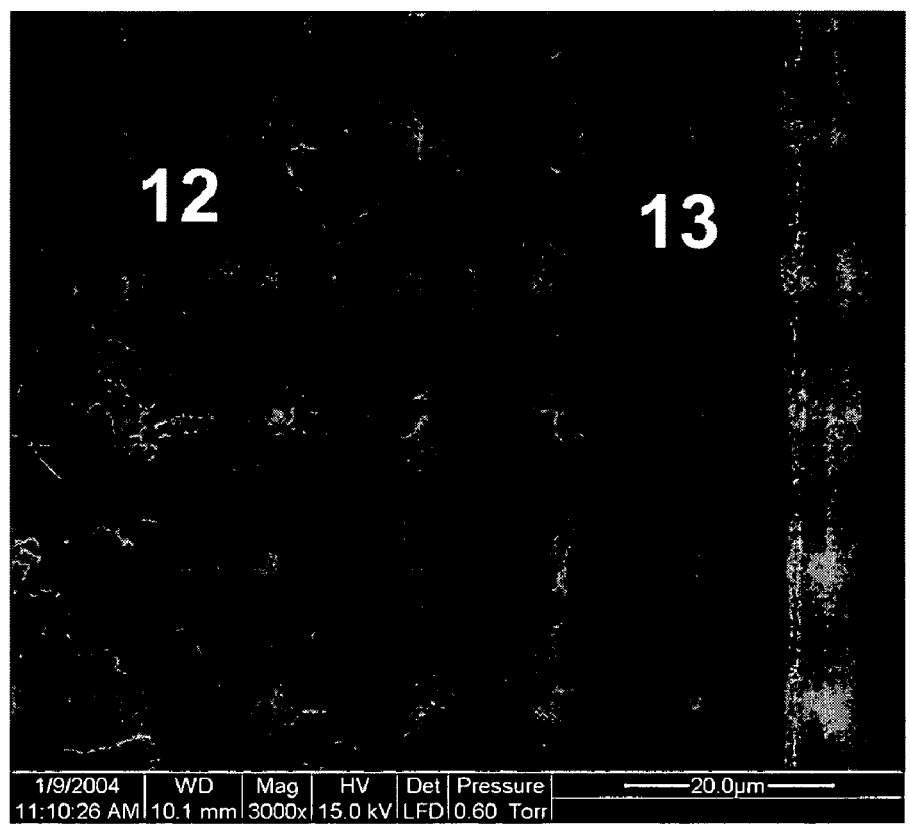
FIG. 4 is a photomicrograph of the dense beta double prime alumina surface of the embodiment of FIG. 2, showing the other surface.
Figure 5:
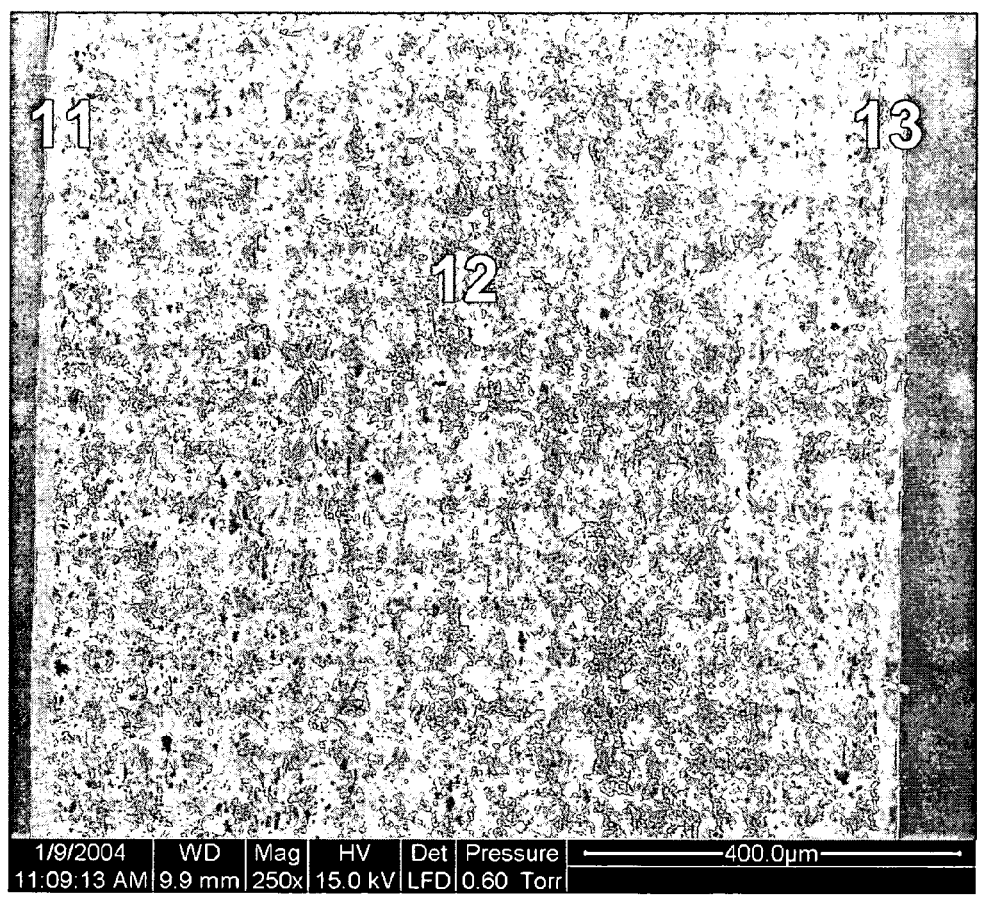
FIG. 5 is another photomicrograph of the beta double prime alumina surface of the embodiment of FIG. 2, showing all three layers.

The laminate from Example 7 was trimmed on each side to produce a square plate and dried in an air oven at 110° C. overnight. It was placed while still hot onto a smooth MgO plate and covered with another MgO plate (that did not touch the surface). The sample was then placed into a high temperature furnace and sintered in air using the following schedule:

1. Ramp to 100° C. at 5° C./min
2. Ramp from 100° C. to 700° C. at 1° C./min
3. Ramp from 700° C. to 1,250° C. at 5° C./min
4. Ramp from 1,250° C. to 1,500° C. at 25° C./min
5. Hold at 1,500° C. for 20 minutes
6. Cool to 1,000° C. at 25° C./min
7. Cool to room temperature at 5° C./min The sample was smooth, flat and glossy on both sides. The final thickness of the laminate was approximately 940 microns and each of the thin dense layers was approximately 20 microns. A corner was broken off and analyzed by scanning electron microscopy. It should be noted that the corner was broken off with some difficulty due to the excellent strength of this laminate. An SEM cross-section is shown in FIGS. 3, 4 and 5. The six layers that had been placed in the center were fused into one and exhibited excellent porosity due to the burnout of the rice hulls. The surface on either side was visually dense and appeared to be a continuation of the porous layer (i.e., there was no visual separation of the layers). AC impedance spectroscopy indicated that the ionic conductivity of this laminate was excellent. Sheets of this laminate can then be utilized in the construction of a high power density sodium sulfur cell.

Although the present invention has been described in terms of specific embodiments, it is anticipated that alterations and modifications thereof will no doubt become apparent to those skilled in the art which are intended to be included within the scope of the following claims.

I claim:

1. A process for forming a three-layered thin film composite solid electrolyte comprising the steps of:
    (a) tape casting a series of sheets or films, each said sheet formed from one of at least two slip composites, each said slip composite containing an electrolyte where the electrolyte of each said slip composite has a coefficient of thermal expansion, said coefficient for each said electrolyte in each said slip composite is identical within +/−5%, wherein one of the said slip composites is formed with an added combustible pore former (a "Porous Material") and another of said slip composites is formed without said pore former material (a "Non Porous Material");

(b) laminating said series of sheets to create a layered structure having at least three layers, where said series of layers alternate between layers formed from said Non-Porous Materials and layers formed from said Porous Materials; and (c) sintering said layered structure at a final sintering temperature to densify said layer formed from said Non Porous Materials to create an ionically conductive layer, whereas said final sintering temperature is about 1500-1600° C.

2. The process of claim 1 wherein said sintering step is performed without encapsulation of said layered structure.

3. The process of claim 1 wherein said sintering step includes the substep of raising the temperature to a first temperature, wherein said first temperature is sufficient to combust said pore former material, and then raising said temperature to the final sintering temperature.

4. The process of claim 3 wherein said substep of raising the temperature to a first temperature is undertaken at a rate to allow gases generated from combustion of said pore former to escape said layered structure without delaminating said layered structure in whole or in part.

5. The process of claim 1 wherein said step of sintering includes the step of raising the temperature to a first temperature suitable to allow combustion of said pore former; then raising said temperature to a second intermediate temperature, then raising the temperature to the final sintering temperature, wherein the rate of temperature rise from said second intermediate temperature to said final sintering temperature is at least about 10° C./minute.

6. The process of claim 5, wherein said second intermediate temperature is in the range of about 1200-1275° C.

7. The process of claim 5 wherein the rate of temperature rise from said second intermediate temperature to said final sintering temperature is at least about +25° C./minute once said temperature is about 1275° C.

8. The process of claim 7 further including the step of lowering said temperature from said final sintering temperature to about said second intermediate temperature wherein the rate of temperature drop from said final sintering temperature to said second intermediate temperature is at least about 25° C./minute until said temperature is about 1275° C.

9. The process of claim 8 wherein said step of lowering said temperature from said final sintering temperature to about said second intermediate temperature takes place at a rate of temperature drop in a range of least about 10-30° C./minute until said temperature is about 1275° C.

10. The process of claim 1 wherein said electrolyte is further comprised of $\beta''-Al_2O_3$ or $\beta-Al_2O_3$ or mixtures thereof.

11. The process of claim 1 wherein the thickness of said layers formed from Non-Porous Materials, after sintering, are less than 100 microns.

12. The process of claim 11 wherein the thickness of said layers formed from said Non Porous Material, after sintering, is less than 50 microns.

13. The process of claim 1 wherein the thickness of said layers formed from Porous Materials is greater than about 100 microns.

14. The process of claim 13 wherein said thickness of said layers formed from Porous Materials is sufficient to provide structural support to said thin film composite solid.

15. The process of claim 1 wherein each of said slip composites contains a binder.

16. The process of claim 1 wherein each of said slip composites contains a plastizer.

17. The process of claim 1 wherein at least one of said layers formed of said Porous Material are laminated from a plurality of said sheets formed from said Porous Material.

18. The process of claim 1 wherein at least one of said layers formed from said Non Porous Material are laminated from a plurality of said sheets formed from said Non Porous Material.

* * * * *